UNITED STATES PATENT OFFICE.

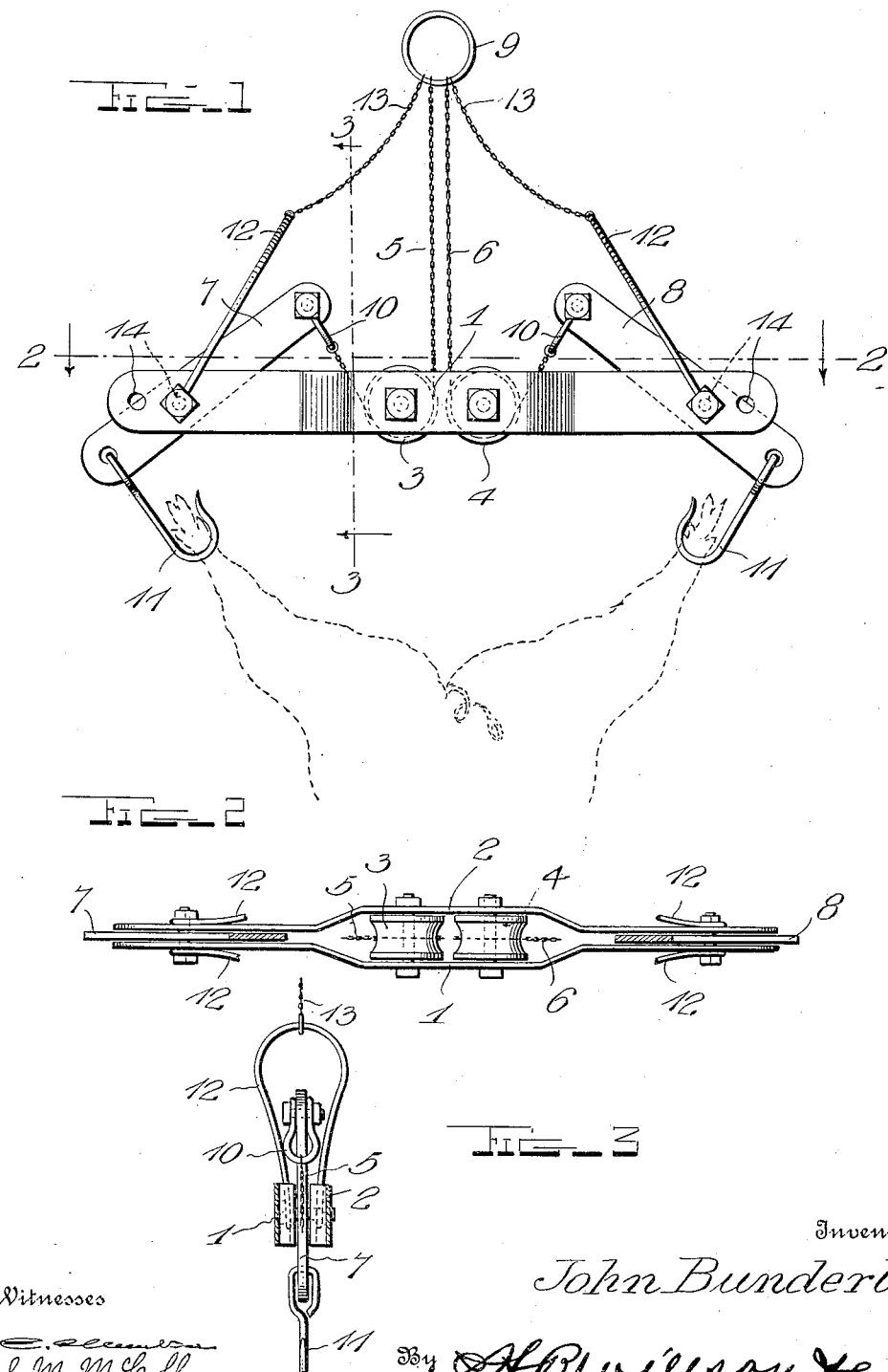

JOHN BUNDERLE, OF DES MOINES TOWNSHIP, JACKSON COUNTY, MINNESOTA.

GAMBREL.

1,049,990.  Specification of Letters Patent.  Patented Jan. 7, 1913.

Application filed July 3, 1912. Serial No. 707,538.

*To all whom it may concern:*

Be it known that I, JOHN BUNDERLE, a citizen of the United States, residing in Des Moines township, in the county of Jackson and State of Minnesota, have invented certain new and useful Improvements in Gambrels; and I do declare the following to be a full, clear, and exact description of the invention, such as will enable others skilled in the art to which it appertains to make and use the same.

This invention relates to gambrels for suspending and spreading the carcasses of animals.

The object of this invention is to provide a simple, strong and efficient device of this character which is adjustable to adapt it for use in spreading large or small animals.

With this and other objects in view, the invention consists of certain novel features of construction, combination and arrangement of parts as will be more fully described and claimed.

In the accompanying drawings; Figure 1 represents a side elevation of this improved gambrel with a hog shown in dotted lines suspended therefrom; Fig. 2 is a horizontal section thereof on line 2—2 of Fig. 1; Fig. 3 is a vertical transverse section on line 3—3 of Fig. 1.

In the embodiment illustrated two bars 1 and 2 are shown connected together at intervals by bolts and having their central portions offset to form when connected a housing for two pulleys 3 and 4 suitably mounted to support and guide flexible elements 5 and 6 connected at one end with links or levers 7 and 8 which are commonly termed swingletrees and which are fulcrumed intermediately of their ends between the opposite ends of the bars 1 and 2 which form what may be termed an evener. The other ends of these flexible elements 5 and 6 which are here shown in the form of chains are connected with a suspending member in the form of a ring 9 which is adapted to be mounted on any suitable support. The ends of these chains are preferably connected with the swingletrees by means of clevises 10 as shown but they may be connected in any other suitable or desired manner. The other ends of the swingletrees are provided with hooks 11 which are adapted to engage the legs of the animal to be spread and are preferably passed through the cords or tendons of the animal's leg.

Clevises 12 are mounted on the bolts which fulcrum the swingletrees to the evener said clevises having opposite ends engaged with opposite faces of the evener. These clevises are connected by flexible elements here shown in the form of chains 13 with the suspending ring 9 and which assist in holding the gambrel in operative position on its support.

The evener composed of the bars 1 and 2 is preferably provided with a plurality of longitudinally spaced apertures 14 at its opposite ends in which the bolts which fulcrum the swingletrees to the evener are designed to be mounted to adapt the device to be used with animals of large or small size, for instance, such as hogs and beef.

In the use of the device the hooks 11 are connected with the cords of each hind leg of the animal to be suspended and when said animal has been raised by a pulley or other device attached to the ring 9 the hook will spread automatically holding the parts in convenient position for further manipulation. Should the animal be cut in half and one portion removed the cable will balance and hold the other half without danger of its falling.

The chains 5 and 6 which are connected with clevises on the inner end of the levers or swingletrees 7 and 8 pass under the pulleys 3 and 4 upward between the pulleys in parallel relation with their other ends secured to the ring as shown clearly in Fig. 1 and which arrangement exerts a pulling action on the inner ends of the levers against the weight carried by the hooks on the other ends thereby forcing said inner ends downward and said outer ends outward in opposite directions which causes the legs of the carcass suspended to be spread apart.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined and claimed.

I claim as my invention:

A gambrel composed of two laterally spaced connected bars having bulges formed therein midway their ends to form a housing, pulleys rotatably mounted in said housing between said bars, spreading levers fulcrumed intermediately of their ends between said bars at the outer ends of said bars, flexible elements connected at one end with the inner ends of said spreading levers and passing under said pulleys, carcass engaging elements carried by the outer free ends of said levers, members pivotally mounted on the fulcrums of said spreading levers, flexible elements connected with said members and a suspending element connected with the free ends of all of said flexible elements.

In testimony whereof I have hereunto set my hand in presence of two subscribing witnesses.

JOHN BUNDERLE.

Witnesses:
F. B. FABER,
MELVINA PAGE.

Copies of this patent may be obtained for five cents each, by addressing the "Commissioner of Patents, Washington, D. C."